UNITED STATES PATENT OFFICE.

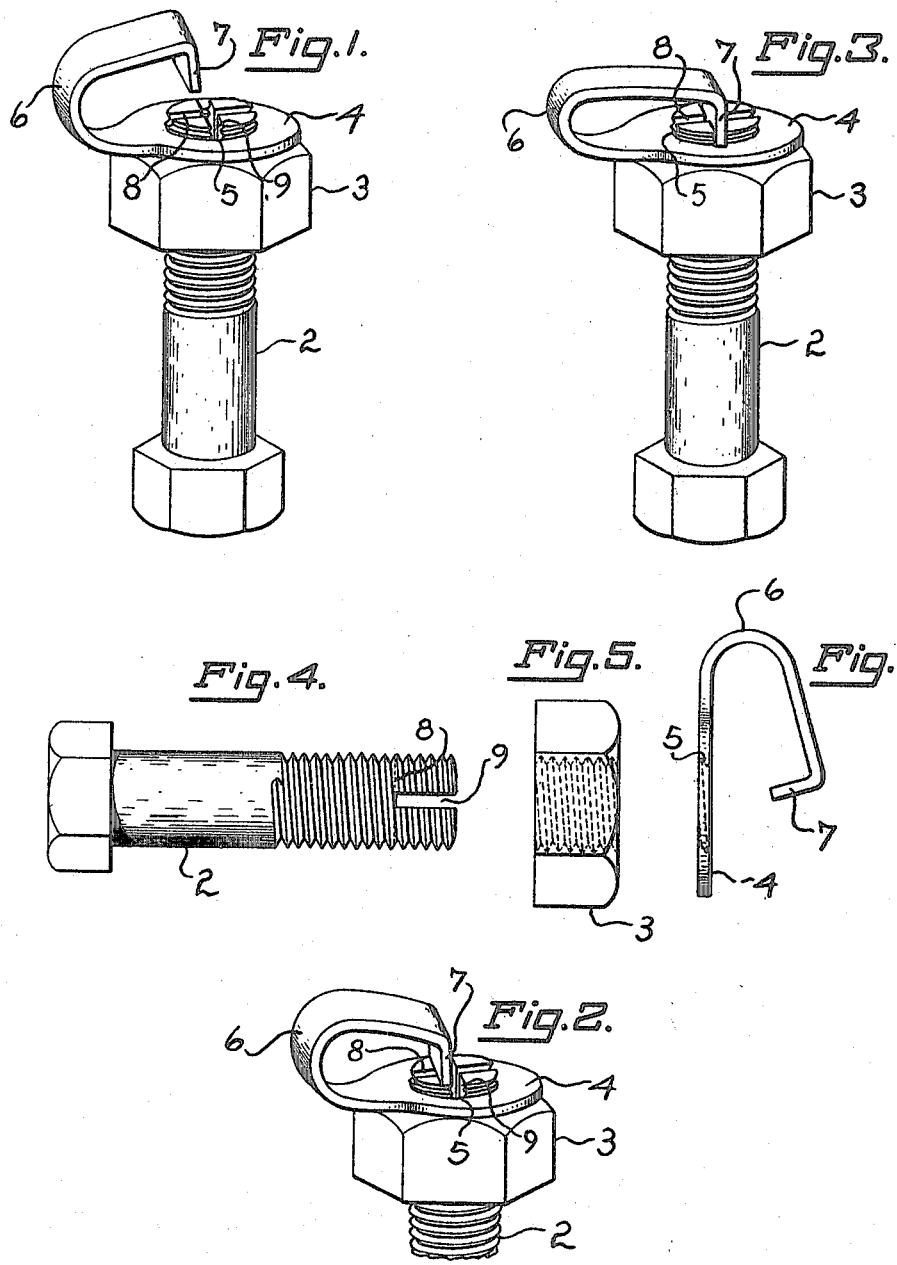

HUBERT C. HART, OF UNIONVILLE, CONNECTICUT.

LOCK-WASHER.

1,216,310.  Specification of Letters Patent.  Patented Feb. 20, 1917.

Application filed September 30, 1916. Serial No. 122,982.

*To all whom it may concern:*

Be it known that I, HUBERT C. HART, a citizen of the United States, residing at Unionville, in the county of Hartford and State of Connecticut, have invented certain new and useful Improvements in Lock-Washers, of which the following is a specification.

This invention relates to lock washers. While a lock washer involving the invention is susceptible of general use, it is of particular utility when combined with a bolt and a nut, being intended in this particular field when in active relation, to prevent accidental separation of the nut from the bolt. The object of the invention is to provide an article of the character set forth which can be inexpensively and easily made and which can be readily applied. The device also has a considerable range of action.

In the drawings accompanying and forming part of the present specification I have shown in detail one convenient form of embodiment of the invention which will be set forth fully in the following description. I do not restrict myself to this particular disclosure; I may depart therefrom in several respects within the scope of the invention defined by the claims following said description.

Referring to said drawings:

Figure 1 is a perspective view of a bolt and a nut equipped with a lock washer involving the invention, the latter being in its unset condition.

Fig. 2 is a like view showing the lock washer partially set and illustrating merely a portion of the bolt.

Fig. 3 is a similar view with the lock washer fully set.

Figs. 4, 5 and 6 are detail views in side elevation of the bolt, nut and lock washer respectively.

Like characters refer to like parts throughout the several views.

While I have termed the invention a lock washer, there is invention also as will be expressed in my claims, between the bolt and its nut and its washer. This washer is preferably made of sheet metal and can be readily stamped from the necessary stock, possessing the desired resiliency, and can be afterward shaped up.

Referring now more particularly to the drawings, the numeral 2 denotes a bolt having the usual head and threaded shank, the latter to receive the nut 3. The lock washer may be made from any desirable material, although resilient sheet metal or other stock possessing the proper resiliency is suitable for the purpose. This lock washer comprises a body or annular part 4 shown as flat and having a central hole 5 interiorly threaded to match the threads of the bolt. Ordinarily but not essentially this body or ring 4 fits flatwise against the outer surface of the nut as shown in Figs. 1 and 2. There may, however, be an interval or space between the two without affecting the holding efficiency of the washer. As shown the body 4 which constitutes the washer proper has projecting approximately radially from one side of it the bowed spring portion 6. This bowed or return band arm 6 as shown terminates at its free or inner end in an inwardly extending tooth or locking portion 7 adapted when in holding position to enter either one of the slots 8 or 9 in the tip portion of the bolt. These slots intersect at a point cut by the longitudinal axis of the bolt; together they are of cruciform shape and extend entirely across the tip end of the bolt. While two of these locking slots or notches are desirable, it is not always essential that they be provided.

Initially the parts will be separated as shown for instance in Figs. 4, 5 and 6. To assemble them, the nut will be first applied to the bolt and run on the required distance, after which the washer member or body 4 will be connected to the threaded portion of the bolt and then toward and into abutment if desired and as is preferable, with the nut. This will bring the free part of the tooth or projection 7 across one of the slots (8 and 9) and short of but in parallelism with the other notch, the tooth being in firm abutment with the spherical or rounded end of the bolt. With the aid then of a suitable hammer, the free branch or member of the U-shaped bendable arm 6 will be flattened down, thus causing the tooth or projection to be driven into the appropriate slot or notch. I have described the bolt and lock washer as successively applied. They may be applied practically at the same time; that is run on together. The notches or slots to which I have referred are made sufficiently deep as to provide a considerable amount of inward movement of the nut, and owing to the fact that the return bowed arm 6 is bendable, the washer body 4 can follow up the nut. It is not necessary, however, as I have already observed that the washer body should abut substantially against the nut, because there can be an interval between the two, and the washer can be so set as to prevent accidental coming off and therefore unintentional unscrewing of the nut. To take off the nut it will be necessary to first open or spread the return bowed arm 6 to carry the tooth 7 out of the notch or slot it may occupy, which results in releasing the washer body. When this takes place the washer body and nut can be unscrewed together.

What I claim is:

1. A lock washer comprising an annular body having a threaded hole and provided with a U-shaped bendable arm extending radially therefrom, the free branch of the arm having an inwardly extending tooth at approximately right angles thereto.

2. The combination of a bolt, a nut on the bolt, a washer between the nut and the tip end of the bolt, the washer having a threaded connection with the bolt and having a U-shaped bendable arm, the free branch of which is provided with an inwardly extending tooth, the tip portion of the bolt being slotted to receive the tooth.

3. The combination of a bolt, a nut on the bolt, a washer in threaded engagement with the bolt between the nut and the tip portion of the bolt, said washer having a U-shaped bendable arm, the free branch of which is provided with an inwardly extending tooth at practically right angles thereto, said tip portion having transverse notches into one of which said tooth is adapted to be projected.

In testimony whereof I affix my signature in the presence of two witnesses.

HUBERT C. HART.

Witnesses:
L. L. MARKEL,
HEATH SUTHERLAND.

Copies of this patent may be obtained for five cents each, by addressing the "Commissioner of Patents, Washington, D. C."